(12) United States Patent
Agirman et al.

(10) Patent No.: US 7,609,534 B2
(45) Date of Patent: Oct. 27, 2009

(54) OPERATING A THREE PHASE DEVICE USING SINGLE PHASE POWER

(75) Inventors: Ismail Agirman, Farnington, CT (US); Vladimir Blasko, Avon, CT (US); Christopher Czerwinski, Farnington, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 11/573,056

(22) PCT Filed: Aug. 19, 2004

(86) PCT No.: PCT/US2004/026974

§ 371 (c)(1), (2), (4) Date: Feb. 1, 2007

(87) PCT Pub. No.: WO2006/022725

PCT Pub. Date: Mar. 2, 2006

(65) Prior Publication Data

US 2007/0253231 A1 Nov. 1, 2007

(51) Int. Cl.
*H02M 5/451* (2006.01)
(52) U.S. Cl. .................... 363/36; 187/296; 318/768
(58) Field of Classification Search .............. 363/36, 363/84, 35; 318/768, 749, 781; 187/289, 187/296
See application file for complete search history.

(56) References Cited

U.S. PATENT DOCUMENTS

| 5,388,041 | A | * | 2/1995 | Carpita ..................... 363/98 |
| 5,504,667 | A | * | 4/1996 | Tanaka et al. ................ 363/37 |
| 5,824,990 | A | * | 10/1998 | Geissler et al. ........ 219/130.21 |
| 5,850,132 | A | | 12/1998 | Garces |
| 6,058,028 | A | * | 5/2000 | Czerwinski ................ 363/44 |
| 6,636,012 | B2 | | 10/2003 | Royak et al. |
| 6,697,268 | B2 | * | 2/2004 | Tomonaga ................ 363/37 |

OTHER PUBLICATIONS

PCT International Search Report and Written Opinion of the International Searching Authority dated Sep. 26, 2007 for International application No. PCT/US04/26974.
International Preliminary Report on Patentability for International application No. PCT/US2004/026974 mailed Nov. 1, 2007.

* cited by examiner

*Primary Examiner*—Adolf Berhane
*Assistant Examiner*—Harry Behm
(74) *Attorney, Agent, or Firm*—Carlson, Gaskey & Olds PC

(57) ABSTRACT

A powering arrangement (32, 34) for a device (30, 22) that normally operates on three phase power has the capability of operating based upon single phase power. One disclosed technique includes estimating a direct component based upon a measured voltage across the leads coupled with the single phase power supply. The quadrature component is estimated based upon a numerical derivative of the direct component. The direct component is also provided to a current regulator in a feed forward control manner, which minimizes error.

11 Claims, 4 Drawing Sheets

OPERATING A THREE PHASE DEVICE USING SINGLE PHASE POWER

FIELD OF THE INVENTION

This invention generally relates to power control systems. More particularly, this invention relates to providing single phase power to a device that normally operates on three phase power.

DESCRIPTION OF THE RELATED ART

Electric motors are well known and widely used. They come in a variety of sizes and styles. One example use of an electric motor is in an elevator machine that moves a drive sheave for propelling an elevator cab up or down through a hoistway, for example.

Recently, regenerative drive machines have been introduced into elevator systems. Regenerative drive machines include an electric motor that draws power from a power source for purposes of moving a car and counterweight through a hoistway in a first direction and generates power that is provided back to the power source when allowing the car and counterweight to move in an opposite direction. The regenerative drives take advantage of the ability of an electric motor to act as a generator when the weight of the car and counterweight cause the desired movement as long as the drive machine allows the drive sheave to be moved accordingly.

Such regenerative drive machines operate on a three phase power input. There are times when a three phase power input is not available. For example, during initial elevator system installation, a three phase power supply to a building site is not usually available. At best, single phase power may be available during elevator system installation. It is desirable to be able to move the elevator car in at least a limited mode during installation in many instances. The difficulty is that without three phase power, a three phase regenerative drive machine is not able to operate and, therefore, cannot be used during elevator installation.

There is a need for being able to utilize a three phase, regenerative drive machine even during elevator installation when three phase power is not available. There are other situations where a three phase device would be useful even when three phase power is not available. This invention addresses the need for being able to provide single phase power for operating a three phase device.

SUMMARY OF THE INVENTION

One example disclosed converter device for using single phase input power to provide power to a three phase device includes a phase locked loop portion that uses an estimated direct component and an estimated quadrature component based on the single phase input power.

In one example, the direct component is estimated based upon a measured voltage of the single phase input power. The quadrature component is estimated based on a numerical derivative of the estimated direct component. In one example, the numerical derivative is scaled based upon a frequency of the input power.

In one example, a current regulator portion uses the estimated direct component of the single phase input power as a feed forward input for minimizing error when supplying current to the three phase device.

The disclosed example arrangements facilitate utilizing a three phase, regenerative device even when only single phase power is available for operating the device.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
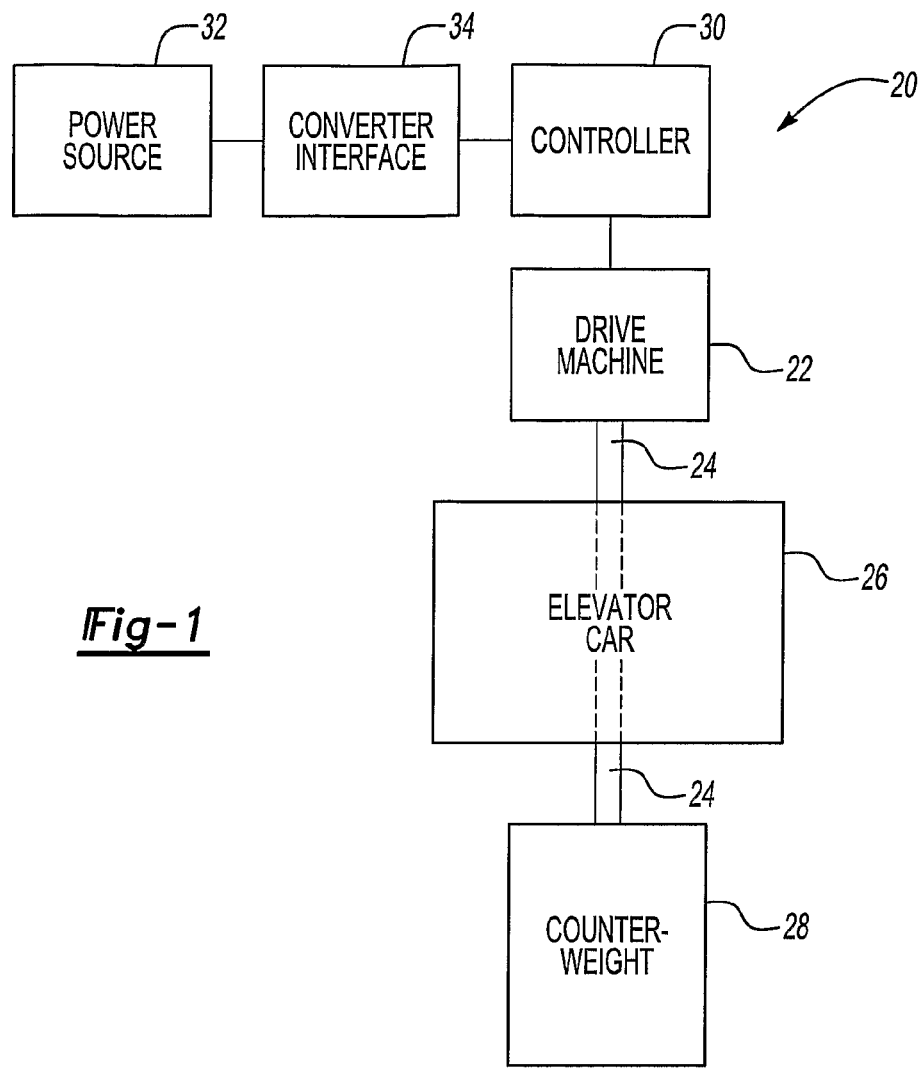
FIG. 1 schematically illustrates selected portions of an elevator system incorporating a three phase device and a powering arrangement designed according to an embodiment of this invention.

FIG. 1 schematically shows selected portions of an elevator system 20. A drive machine 22 includes an electric motor, for example, for propelling roping 24 to cause desired movement of an elevator car 26 and a counterweight 28 through a hoistway in a known manner. In this example, the drive machine 22 includes a regenerative, three phase machine such that the electric motor can be used for providing power in a generator mode according to known motor operation principles. The drive machine 22 in this example includes an electric motor that operates based upon three phase electrical power under normal circumstances.

A controller 30 provides control signals for operating the motor of the drive machine 22. The controller 30 receives power from a power source 32 that ultimately is a three phase power source. A converter interface 34 ensures, for example, that there is an appropriate phase provided to the controller 30 to achieve the desired drive machine operation.

Under some circumstances, such as during elevator system installation, the power source 32 may not be available as a three phase power source. In some instances, single phase power is available during building construction and, therefore, elevator system installation. The converter interface 34 of this example is useable regardless of whether the power source 32 is a single phase power source or a three phase power source. The converter interface 34 operates in a manner that accommodates the difference between a single phase power source and a three phase power source so that the controller 30 and drive machine 22 can operate in at least a limited mode during elevator system installation. One advantage of the disclosed example is that the converter interface 34 does not require a separate converter or separate hardware components for operating responsive to single phase power. Instead, the converter interface 34 accommodates machine operation whether the power source supply is three phase or single phase.

Figure 2:
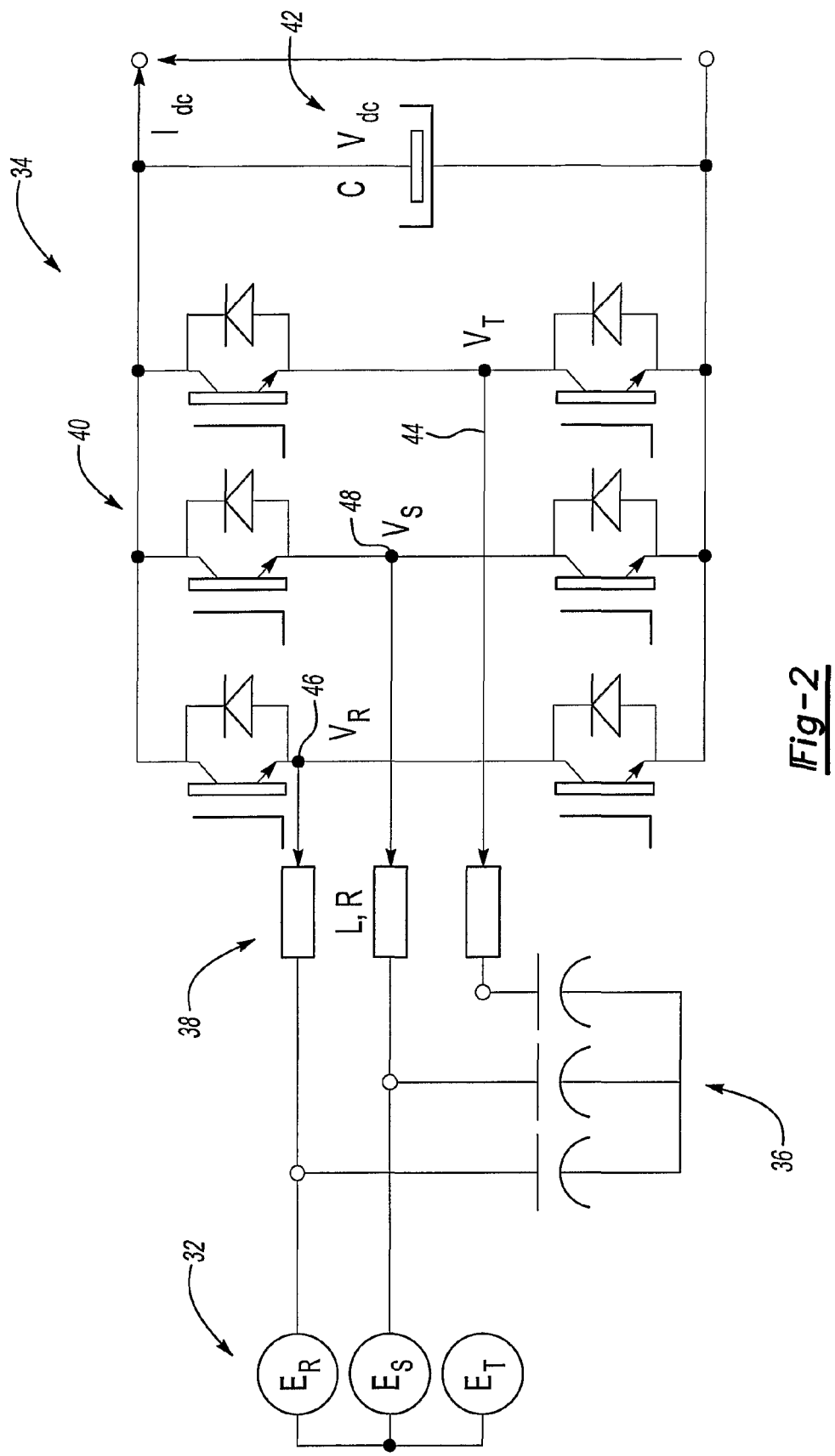
FIG. 2 schematically illustrates selected portions of an example converter interface useful with an embodiment of this invention.

FIG. 2 schematically illustrates selected portions of one example converter interface 34. A filter portion 36 operates in a generally known manner. A current regulator portion 38 has inductive and resistive elements as known to regulate the current provided to a phase locked loop (PLL) portion 40. A bus voltage regulation portion 42 provides the ultimate current signal to the controller 30 for drive machine 22 operation.

The example converter interface 34 of FIG. 2 normally operates when the power source 32 provides three phase power (i.e., an R phase, an S phase and a T phase). The example of FIG. 2 is shown in a condition that is well suited for responding to single phase power. The T input 44 (i.e., the IGBT H-bridge T input) is disconnected and does not receive any power. This can be accomplished by a mechanical switch (not illustrated), for example, within the converter interface 34. Accordingly, when a technician is going to couple single phase power for running the controller 30 and drive machine 22, an appropriate switch can be manipulated so that the T input 44 of the IGBT legs will not be connected to the power source 32. The outputs from the PLL portion 40 and the bus voltage regulator portion 42 operate solely based on the R input 46 and the S input 48 of the IGBT legs. A control scheme that provides the switching functions for the IGBT H-bridge at the R and S inputs 46 and 48 allows for operating the drive machine 22 responsive to the single phase power. In this example, the R input 46 is coupled to one lead of the single phase power leads while the S input 48 is coupled to the other lead.

Figure 3:
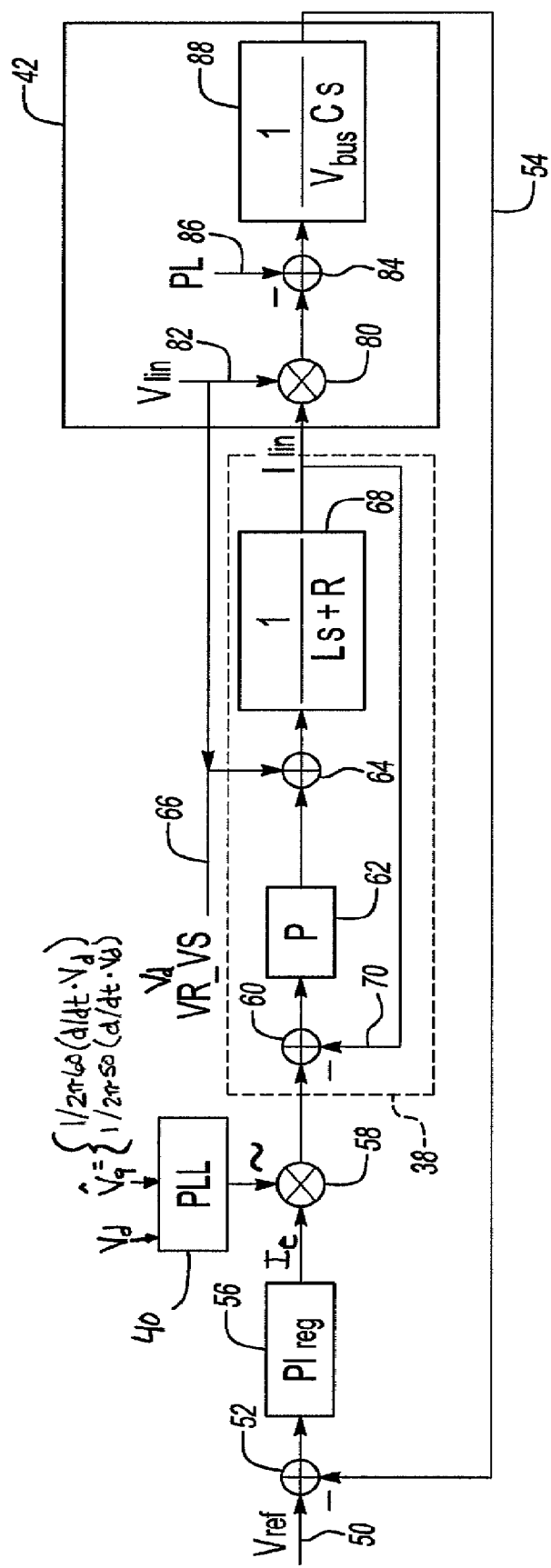
FIG. 3 schematically illustrates an example single phase control scheme useful with an embodiment of this invention.

FIG. 3 schematically shows an example control scheme that provides the switching functions for operation using single phase power. A reference voltage 50 is provided to a summer 52. In one example, the reference voltage is 750 volts. The reference voltage will depend, in part, on the available power supply. The output of the bus voltage regulator portion 42 is provided at 54, which provides the current to the controller 30. The output 54 is provided to a negative input to the summer 52.

The output of the summer 52 is provided to a proportional integral regulator 56. The function of the proportional integral regulator 56 is to provide an indication of how much current ($I_b$) is necessary to eliminate error between the desired current level and the output current level 54 that is ultimately provided to the controller 30.

The output of the proportional integral regulator 56 is provided to a multiplier 58. The other input to the multiplier 58 is from the PLL portion 40. In this example, the PLL portion 40 uses an estimate of the quadrature component of the phase of the input power. Because single phase power is provided and the PLL normally operates based upon three phase power, there is a need for effectively converting the single phase power into a three phase model for operation purposes.

In this example, the PLL portion 40 uses an estimate of the direct component ($V_d$) phase and the quadrature component ($V_q$) phase of the input power. In one example, the voltage across the inputs 46 and 48 is sensed using conventional techniques. That measured voltage is used as an estimate of the direct component phase.

The quadrature component phase is estimated in this example by taking a numerical derivative of the direct component phase. The scale of the quadrature component in one example is adjusted after the numerical differentiation of the direct component phase of the line voltage.

In one example, $V_d = V_{ac} \sin(\theta)$ and it follows that d/dt $V_d = V_{ac} \omega_{line} \cos(\theta)$. In general, the line frequency is not known but it will be either 50 or 60 Hertz. In this example, estimating the quadrature component of the phase includes scaling the numeral derivative based upon the estimated line frequency, which is accomplished by the PLL portion 40. In one example, if the frequency is greater than 55 Hz, a gain of $1/\omega_{line} = 1/(2\pi\, 60)$ is applied. If the frequency is less than 55 Hz, a gain of $1/\omega_{line} = 1/(2\pi\, 50)$ is used. The estimated quadrature component phase (i.e., the q-axis voltage) for the PLL portion 40 is $\hat{V}_q = 1/\omega_{line} (d/dt\, V_d)$.

Once the estimated quadrature component is obtained, the phase locked loop portion 40 operates as the three-phase equivalent.

In FIG. 3, the output from the PLL portion 40 to the multiplier 58 is a sinusoidal reference output from the phase locked loop that is in phase with the line voltage and is combined with the output of the proportional integral regulator 56 to provide a current reference for the current regulator portion 38.

The input to the current regulator portion 38 is provided to a positive input of a summer 60. The output of the summer 60 is provided to a proportional regulator 62. The output of the proportional regulator 62 is provided to a summer 64 where it is combined with a feed forward input 66. In this example, the feed forward input 66 is denoted VR_VS. This voltage is the same as the sensed line voltage between the R and S inputs 46 and 48. The feed forward input 66 provides the current regulator 38 with the ability to minimize current regulation error. In one example, the feed forward input 66 is the same as the direct component of the input to the PLL portion 40.

The output of the summer 64 is processed in a generally known manner by the current regulator elements 68 resulting in a line current I_line.

Figure 4:
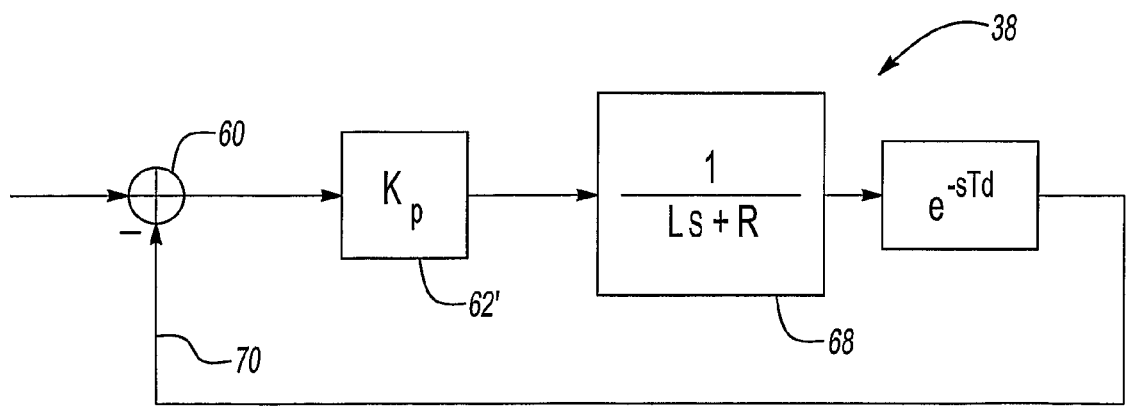
FIG. 4 schematically shows an example current regulator model useful with an embodiment of this invention.

Because a single phase current regulator operates differently then a synchronous current regulator in that the disturbance for a single phase current regulator is not constant, a proportional regulator 62 is provided in the example of FIG. 3 instead of a proportional integral regulator. As known, proportional integral regulators reject constant disturbances quite well but the disturbance for a single phase current regulator is not constant. In this example, a strategic combination of a proportional regulator with the feed forward input 66, which acts as the disturbance and corresponds to the sinusoidal line voltage associated with the R and S inputs 46 and 48, for example. In the event that the feed forward input 66 cancels the voltage disturbance, the current regulator 38 can be modeled as shown in FIG. 4.

In one example, the bandwidth of the proportional regulator 62 is based upon a proportional integral regulator design. As shown in FIG. 4, the regulator 62' is modeled as a function block having a gain $K_p$. Given a requirement that the desired phase margin, $\emptyset_m = 60°$ is needed, then the proportional gain can be solved from: $K_p = L\omega_c$, $K_i = \omega_c R$, where the desired bandwidth $\omega_c$ can be determined from the delay $T_d$ and desired phase margin constraints using the equation: $\omega_c = (\pi/2 - \emptyset_m)/T_d$. The delay $T_d$ includes the sampling delay and one-half a pulse width modulation period. Using $\omega_c$ as the bandwidth for the proportional regulator 62', the proportional gain $K_p$ is determined as follows.

The closed loop transfer function is $$\frac{Kp}{Ls + R + Kp}.$$

Then $K_p = L\omega_c - R \approx L\omega_c$. In this example, L is twice the inductance of its three-phase equivalent. The resulting phase margin is larger than 60° in case of a proportional regulator. If a higher bandwidth is desired, those skilled in the art who have the benefit of this description will realize how to use a lower phase margin to obtain a larger bandwidth.

The output of the current regulator 38 is provided to a multiplier 80 within the bus voltage regulator 42. The other input 82 to the multiplier 80 is the actual line voltage measurement. The output of the multiplier 80 is provided to a summer 84 that has a load power input 86 into a negative input of the summer 84. A regulator function block 88 is shown that provides DC bus voltage regulation in a generally known manner. In this example, the controller 30 operates responsive to the single phase input and the bus voltage regulator provides an output suitable for that purpose. In this example, the following equation is true:

$$C\frac{d}{dt}V_{bus} = V_{line}I_{line}/V_{bus} - P_L/V_{bus}.$$

The input power using a single phase power supply is sinusoidal and, therefore, in this example average values are used for the bus voltage. In one example, the average is 0.5 ($V_{ac}I$), where $V_{ac}$ is the peak voltage and I is the amplitude of the line current. Accordingly, the bus voltage PI regulator design can be based upon the following relationship:

$$C\frac{d}{dt}V_{bus} = .5V_{ac}I/V_{bus} - P_L/V_{bus}$$

Figure 5:
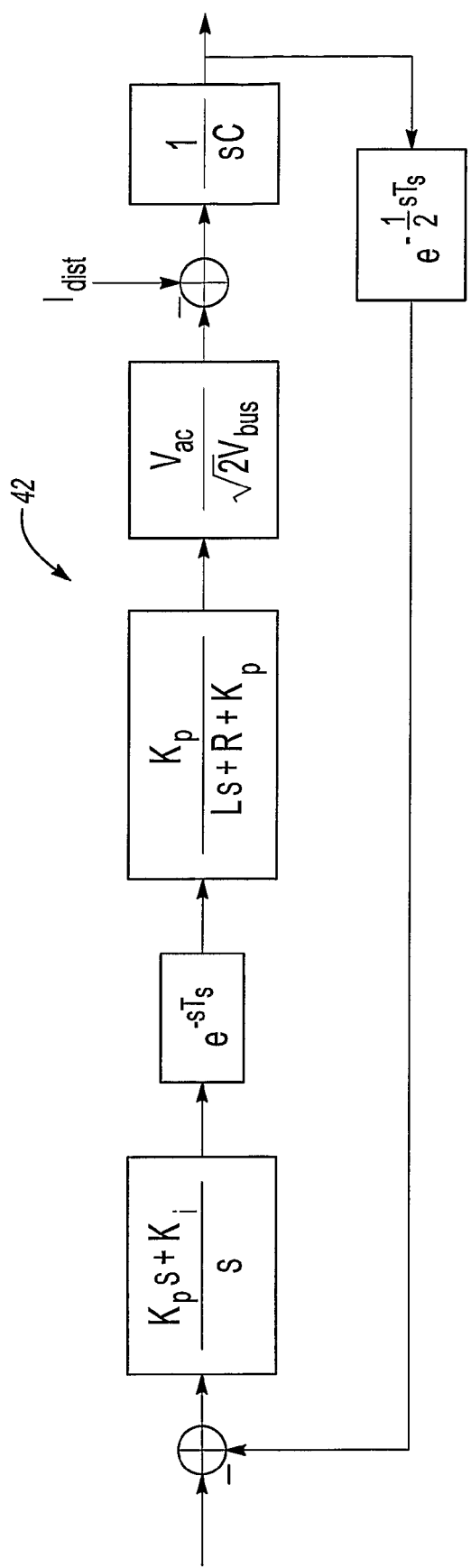
FIG. 5 schematically shows one model of an example voltage regulator useful with an embodiment of this invention.

In one example, the DC bus voltage regulator 42 can be modeled as schematically shown in FIG. 5. The relationship shown in FIG. 5 includes a proportional gain $K_p$ and an integral gain $K_i$. These can be determined based on the following relationships.

In one example, the current regulator bandwidth is larger than the dc bus voltage regulator bandwidth so the open loop transfer function at the cross-over frequency satisfies the following:

$$|H(j\omega_c)| \cong \frac{V_{ac}}{\sqrt{2V_{bus}}}\frac{\sqrt{K_p^2\omega_c^2 + K_i^2}}{C\omega_c^2} = 1,$$

$$\angle H(j\omega_c) = \tan^{-1}\left(\frac{K_p\omega_c}{K_i}\right) - \tan^{-1}\left(\frac{\omega_c}{R+K_p}\frac{L}{}\right) - 1.5\omega_c T_s - \pi = \phi_m - \pi$$

From the magnitude equation:

$$K_p^2 = \frac{C^2}{2V_{ac}^2}\omega_c^2 V_{bus}^2 - \frac{K_i^2}{\omega_c^2},$$

and from the phase equation:

$$\frac{K_p}{K_i}\omega_c = \tan\left(\phi_m + 1.5\omega_c T_s + \tan^{-1}\left(\frac{\omega_c L}{R+K_p}\right)\right).$$

From these two equations $K_p$ and $K_i$ can be solved as:

$$K_p = \frac{C\omega_c}{\sqrt{2V_{ac}}}\frac{V_{bus}}{}\sin(\alpha),$$

$$K_i = \frac{C\omega_c^2}{\sqrt{2V_{ac}}}\frac{V_{bus}}{}\cos(\alpha),$$

where $\alpha = \phi_m + 1.5\omega_c T_s + \tan^{-1}\left(\frac{\omega_c L}{R+K_p}\right).$ In one example, pulse width modulation is used for providing current to the controller 30 in a manner that is useful for controlling the drive machine 22 responsive to the single phase power. In one example, the pulse width modulation switching function applied to the R input 46 and the S input 48 is complementary. In this example, while the R input 46 is connected to the positive bus, the S input 48 is connected to the negative bus. In this manner, the voltage range available from the bus can be fully utilized.

One example pulse width modulation scheme includes using a duty radio, d, which ranges between 0 and 1. In this example, a 0 value means that the associated phase is connected to the negative bus for the full pulse width modulation cycle. A 1 in this example means that the associated phase is connected to the positive bus for the entire pulse width modulation cycle. The following relationship is useful in one example. $d_r = V^*/2V_{bus} + 0.5$, which is the duty ratio for the R input 46. $d_r$ describes the amount of time the R input 46 is turned on during the carrier period. V* is the voltage reference, including the feed-forward term described above, that is provided to the pulse width modulation generator. $d_s$, which is the duty ratio for the S input 48 can be described as $1-d_r$. A duty ratio $d_t$ of 0.5 preferably is provided to the T input 44 in this example so that 0 volts is provided on the T input 44.

By utilizing an estimation of the quadrature and direct phase components based on the single phase voltage, the disclosed example makes it possible to use a configuration designed for three phase power to also operate with a single phase power input. Providing the D-axis or the direct component of the phase to the current regulator in a feed forward manner minimizes error and allows the disclosed example to operate based upon single phase power.

Although the disclosed example has been described in the context of providing power to a drive machine for an elevator system, the invention is not necessarily limited to elevator systems.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for providing power to an elevator machine, comprising a converter interface configured to be between a power source and an elevator machine controller, the converter interface providing an output current to the controller, the converter interface comprising:

a phase locked loop portion having three phase inputs, all three of the phase inputs being coupled to a lead of three phase input power if three phase input power is available from the power source, one of the phase inputs being set at zero and two others of the three phase inputs each being coupled to a lead of single phase input power if only single phase input is available from the power source, the phase locked loop portion using an estimated direct component and an estimated quadrature component based on the single phase input power when the single phase input power is available, the estimated direct component comprising a measured voltage of the single phase power;

a proportional integral regulator that provides an indication of a current for eliminating error between a desired current level provided to the controller and an output current level from the converter interface; and a current regulator portion that uses (i) an output from the phase locked loop portion combined with an output from the proportional integral regulator and (ii) the estimated direct component as a feed-forward input, the current regulator portion allowing the converter interface to provide three phase output power to the elevator machine controller if either the three phase input power or the single phase input power is available.

2. The device of claim 1, wherein the phase locked loop portion has an R phase input, an S phase input and a T phase input and wherein the T phase input is set at zero volts and the R and S phase inputs are coupled to the leads of the single phase input power.

3. The device of claim 1, wherein the phase locked loop portion uses a numerical derivative of the estimated direct component as the estimated quadrature component.

4. The device of claim 3, wherein the phase locked loop portion uses a scaled version of the numerical derivative and wherein a scale applied to the numerical derivative is determined based on a frequency of the single phase input power.

5. The device of claim 4, wherein a first scale is applied to the numerical derivative if the frequency is above 55 Hz and a second scale is applied if the frequency is below 55 Hz.

6. The device of claim 1, wherein the current regulator portion comprises a proportional regulator that is responsive to a non-constant disturbance associated with the single phase input power.

7. The device of claim 6, wherein the feed-forward input is the non-constant disturbance.

8. A method of providing power to an elevator machine, comprising
using a converter interface between a power source and an elevator machine controller to provide three phase output power to the elevator machine controller if either three phase input power or single phase input power is available from the power source;
using the three phase input power from the power source when three phase input power is available; and
using the single phase input power from the power source when only single phase input power is available including
determining an estimated direct component and an estimated quadrature component based on the single phase input power, the estimated direct component comprising a measured voltage of the single phase power;
determining a sinusoidal reference in phase with single phase voltage from the power source based on the estimated direct and quadrature components;
determining a current for eliminating error between a desired current level provided to the controller and an output current level from the converter interface; and
regulating current provided to the elevator machine controller based on (i) the determined sinusoidal reference combined with the determined current for eliminating error and (ii) the estimated direct component as a feed-forward input.

9. The method of claim 8, comprising using a numerical derivative of the estimated direct component as the estimated quadrature component.

10. The method of claim 9, comprising
using a scaled version of the numerical derivative; and
applying a scale to the numerical derivative that is determined based on a frequency of the single phase input power.

11. The method of claim 10, comprising applying a first scale to the numerical derivative if the frequency is above 55 Hz and a second scale is applied if the frequency is below 55 Hz.

* * * * *